US009727495B2

(12) United States Patent
Inooka et al.

(10) Patent No.: US 9,727,495 B2
(45) Date of Patent: Aug. 8, 2017

(54) PERIPHERAL EQUIPMENT CONTROL DEVICE AND INFORMATION PROCESSING

(71) Applicant: Sony Computer Entertainment Inc., Tokyo (JP)

(72) Inventors: Hidehiro Inooka, Tokyo (JP); Yuta Wakasugi, Tokyo (JP); Seiji Asano, Chiba (JP); Yuichi Inomata, Tokyo (JP); Hirotoshi Tokumo, Tokyo (JP); Michitoshi Kakuta, Tokyo (JP); Masaki Minobe, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 347 days.

(21) Appl. No.: 14/452,818

(22) Filed: Aug. 6, 2014

(65) Prior Publication Data

US 2015/0067211 A1 Mar. 5, 2015

(30) Foreign Application Priority Data

Aug. 30, 2013 (JP) ................................ 2013-180543

(51) Int. Cl.
| | |
|---|---|
| *G06F 13/00* | (2006.01) |
| *G06F 13/12* | (2006.01) |
| *G06F 13/364* | (2006.01) |

(52) U.S. Cl.
CPC .......... *G06F 13/126* (2013.01); *G06F 13/364* (2013.01); *Y02B 60/1228* (2013.01)

(58) Field of Classification Search
CPC G06F 13/36; G06F 13/362; G05B 2219/1215
(Continued)

(56) References Cited

U.S. PATENT DOCUMENTS 5,862,375 A * 1/1999 Gephardt ............ G06F 12/0684
710/10
7,263,564 B2 * 8/2007 Chen .................... G06F 1/3215
710/109
(Continued)

FOREIGN PATENT DOCUMENTS

| CN | 101046783 A | 10/2007 |
|---|---|---|
| CN | 101051279 A | 10/2007 |

(Continued)

OTHER PUBLICATIONS

Office Action for corresponding JP Application No. 2013180543, dated Jun. 23, 2015.
(Continued)

*Primary Examiner* — Tim T Vo
*Assistant Examiner* — Kim T. Huynh
(74) *Attorney, Agent, or Firm* — Matthew B. Dernier, Esq.

(57) ABSTRACT

Disclosed herein is a peripheral equipment control device controlling data flow via a peripheral equipment, the peripheral equipment control device including: a peripheral equipment control processor that can control an operation of one or more peripheral equipment; and a bus adapted to connect the peripheral equipment control processor, a main processor, and the one or more peripheral equipment, the main processor being provided outside the peripheral equipment control device to control the operation of the one or more peripheral equipment, in which the bus stores addresses that are referenced by the main processor and the peripheral equipment control processor to access the one or more peripheral equipment, and the bus prohibits access to the peripheral equipment by the peripheral equipment control processor while the main processor is active.

6 Claims, 9 Drawing Sheets

(58) Field of Classification Search
 USPC .......... 710/110, 100, 305–306; 713/300–340
 See application file for complete search history.

(56) References Cited

U.S. PATENT DOCUMENTS

| | | | |
|---|---|---|---|
| 2005/0188142 A1* | 8/2005 | Nakajima | G06F 1/3287 710/303 |
| 2010/0049877 A1* | 2/2010 | Li et al. | G06F 13/00 710/10 |
| 2010/0064036 A1 | 3/2010 | Li | |

FOREIGN PATENT DOCUMENTS

| | | |
|---|---|---|
| JP | 2005235043 A | 9/2005 |
| JP | 2007094528 A | 4/2007 |
| JP | 2007141166 A | 6/2007 |

OTHER PUBLICATIONS

Office Action for corresponding CN Application No. 2014104181203, 13 pages, dated Dec. 5, 2016.

* cited by examiner

FIG.3

| MODE / PROCESSOR | MAIN PROCESSOR | PERIPHERAL EQUIPMENT CONTROL PROCESSOR | SYSTEM CONTROL MICROCOMPUTER |
|---|---|---|---|
| FIRST OPERATION MODE (BRIDGE MODE) | ACTIVE | STANDBY | ACTIVE |
| SECOND OPERATION MODE (SUBSYSTEM MODE) | INACTIVE | ACTIVE | ACTIVE |
| THIRD OPERATION MODE (STANDBY MODE) | INACTIVE | INACTIVE | ACTIVE |

F I G . 6

262

| | FIRST OPERATION MODE | | | SECOND OPERATION MODE | | | THIRD OPERATION MODE | | |
|---|---|---|---|---|---|---|---|---|---|
| | MAIN PROCESSOR | PERIPHERAL EQUIPMENT CONTROL PROCESSOR | SYSTEM CONTROL MICROCOMPUTER | MAIN PROCESSOR | PERIPHERAL EQUIPMENT CONTROL PROCESSOR | SYSTEM CONTROL MICROCOMPUTER | MAIN PROCESSOR | PERIPHERAL EQUIPMENT CONTROL PROCESSOR | SYSTEM CONTROL MICROCOMPUTER |
| PERIPHERAL EQUIPMENT A | PERMITTED | PROHIBITED | PROHIBITED | INACTIVE | PERMITTED | PROHIBITED | INACTIVE | INACTIVE | PROHIBITED |
| PERIPHERAL EQUIPMENT B | PERMITTED | PROHIBITED | PROHIBITED | INACTIVE | PERMITTED | PROHIBITED | INACTIVE | INACTIVE | PROHIBITED |
| ... | PERMITTED | PROHIBITED | PROHIBITED | INACTIVE | PERMITTED | PROHIBITED | INACTIVE | INACTIVE | PROHIBITED |
| 1ST STORAGE DEVICE REFERENCE ADDRESS | PERMITTED | PERMITTED | PROHIBITED | INACTIVE | PROHIBITED | PROHIBITED | INACTIVE | INACTIVE | PROHIBITED |
| 2ND STORAGE DEVICE REFERENCE ADDRESS | PERMITTED | PERMITTED ON CONDITION | PERMITTED ON CONDITION | INACTIVE | PERMITTED | PERMITTED | INACTIVE | INACTIVE | PERMITTED |

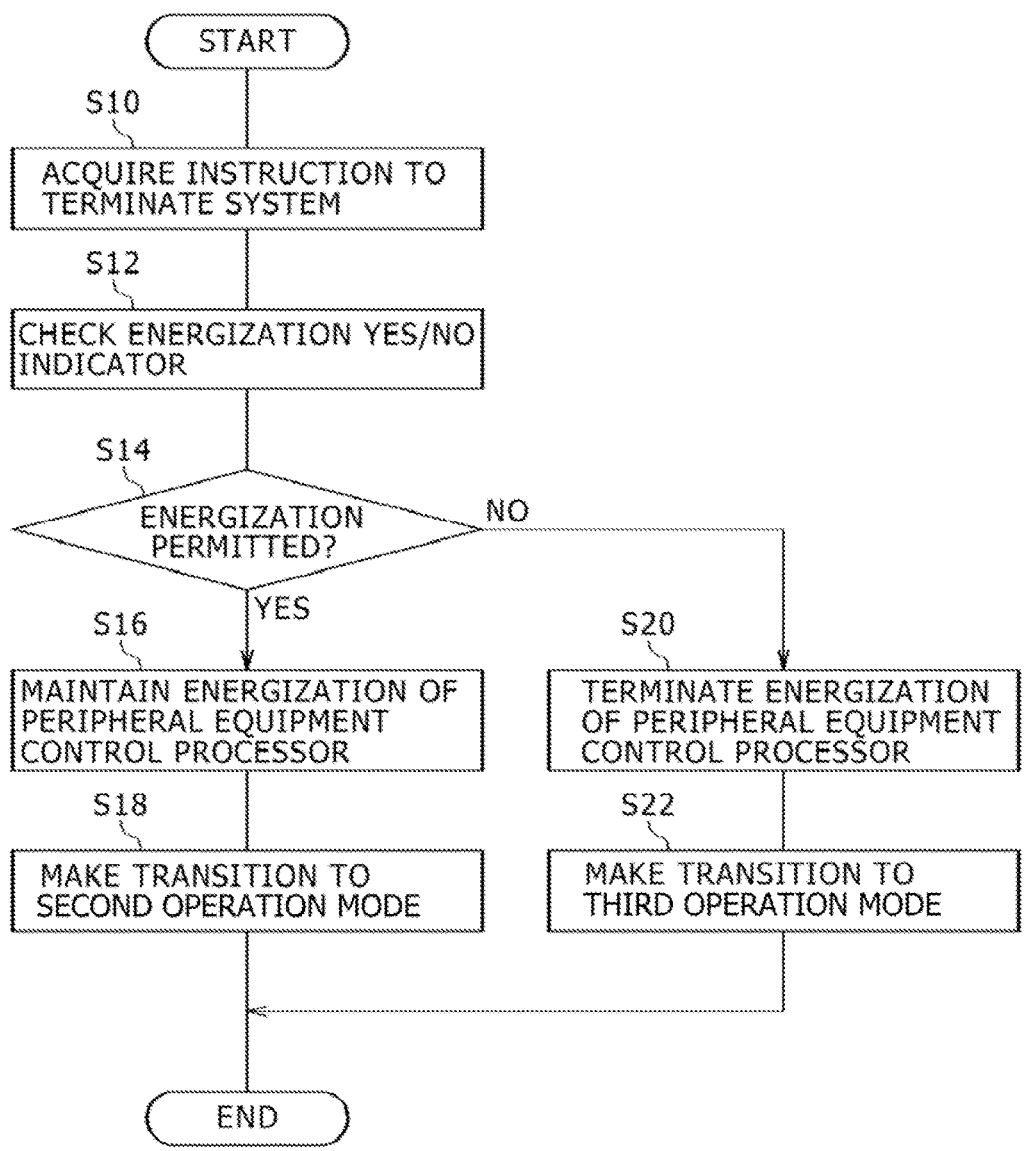

PERIPHERAL EQUIPMENT CONTROL DEVICE AND INFORMATION PROCESSING

BACKGROUND

The present disclosure relates to a peripheral equipment control device and an information processing device having the same.

Recent years have seen rapid sophistication of information processing devices such as PCs (Personal Computers) and game consoles. These information processing devices each include a high performance CPU (Central Processing Unit) to transfer a large amount of data to a variety of peripheral equipment and process acquired data.

SUMMARY

The capacities of programs executed by and data handled by the information processing devices tend to increase with increasing sophistication of these devices. For example, the period of time it takes to download these programs and data via a network tends to increase. On the other hand, the reduction in power consumption of these equipment is desired.

In light of the foregoing, it is desirable to provide a technology suppressing power consumption necessary to control peripheral equipment.

According to an embodiment of the present disclosure, there is provided a peripheral equipment control device that controls data flow via a peripheral equipment. The peripheral equipment control device includes a peripheral equipment control processor and a bus. The peripheral equipment control processor can control an operation of at least one peripheral equipment. The bus connects the peripheral equipment control processor, a main processor, and the one or more peripheral equipment. The main processor is provided outside the peripheral equipment control device to control the operation of the one or more peripheral equipment. The bus stores addresses that are referenced by the main processor and the peripheral equipment control processor to access the one or more peripheral equipment. The bus prohibits access to the peripheral equipment by the peripheral equipment control processor while the main processor is active.

According to another embodiment of the present disclosure, there is provided an information processing device that includes a peripheral equipment, a peripheral equipment control device, and a main processor. The peripheral equipment control device controls data flow via a peripheral equipment. The main processor is provided outside the peripheral equipment control device to control the operation of the one or more peripheral equipment. The peripheral equipment control device has a peripheral equipment control processor and a bus. The peripheral equipment control processor can control the operation of the one or more peripheral equipment. The bus connects the peripheral equipment control processor, the main processor, and the one or more peripheral equipment. The bus stores addresses that are referenced by the main processor and the peripheral equipment control processor to access the one or more peripheral equipment. The bus prohibits access to the peripheral equipment by the peripheral equipment control processor while the main processor is energized and active.

It should be noted that any combinations of the above components and any conversions of expressions of the present disclosure between "method," "device," "system," "computer program," "data structure," "recording media," and so on are also effective as modes of the present disclosure.

The present disclosure provides a technology suppressing power consumption necessary to control peripheral equipment.

BRIEF DESCRIPTION OF THE DRAWINGS

FIG. 3 is a diagram illustrating operation modes that can be assumed by the information processing device according to the embodiment;

FIG. 6 is a diagram schematically illustrating a data structure of a control address storage section according to the embodiment;

FIG. 7 is a flowchart describing a processing flow followed when the information processing device according to the embodiment makes a transition from a first operation mode to other operation mode;

DETAILED DESCRIPTION OF THE PREFERRED EMBODIMENT

A description will be given below of an embodiment of the present disclosure. An information processing device according to the embodiment of the present disclosure includes, in addition to a main processor, a peripheral equipment control processor that offers lower power consumption than the main processor and that is specifically designed to control peripheral equipment. When active, the main processor controls peripheral equipment. However, when the main processor is inactive, the peripheral equipment control processor controls the operation of the peripheral equipment. The peripheral equipment control processor contributes to reduced power consumption necessary to control the peripheral equipment by taking charge of software processing which is time-consuming although small in terms of load.

(Configuration of the Information Processing System)

Figure 1:
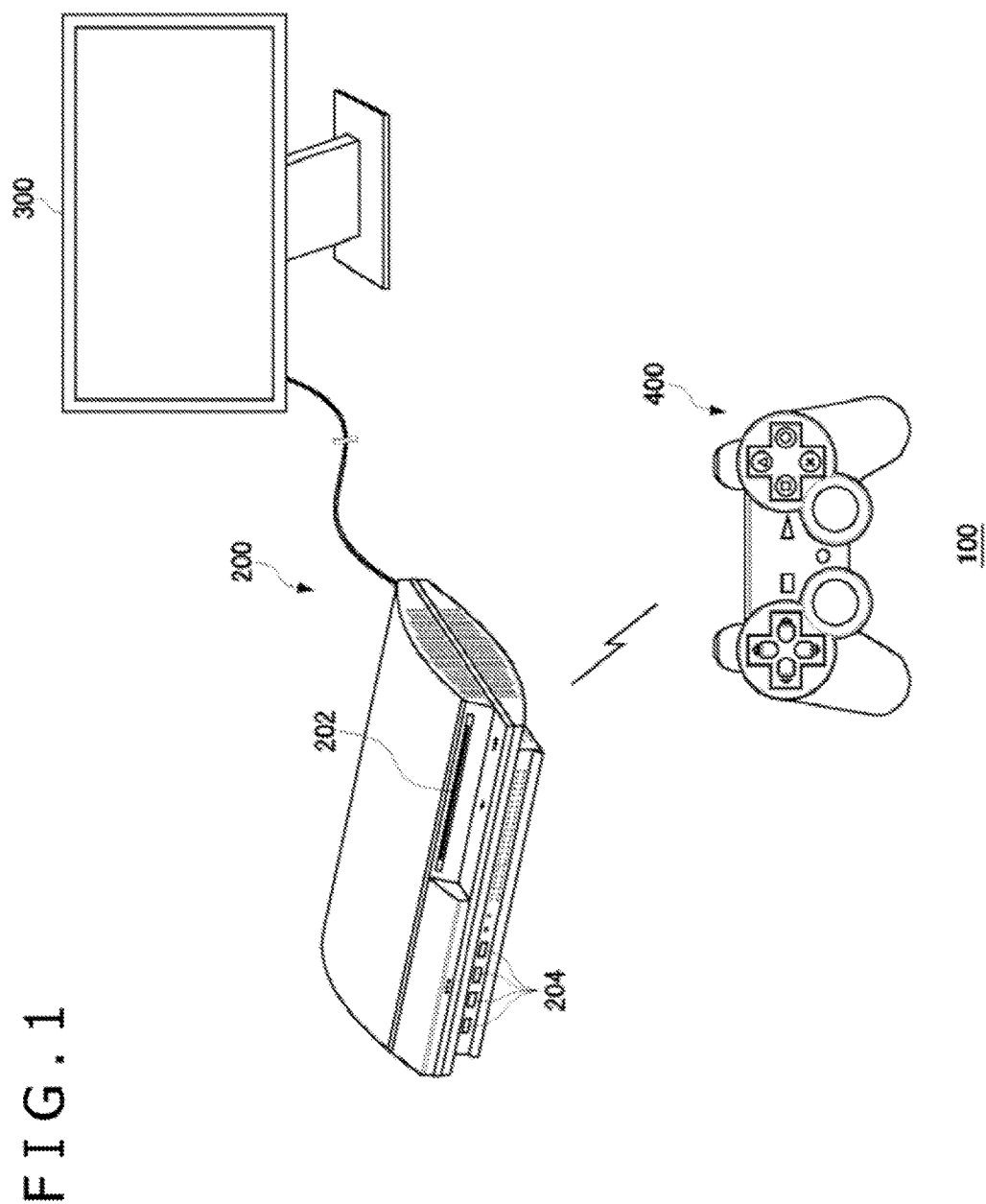
FIG. 1 is a diagram illustrating an example of an information processing system according to an embodiment.

FIG. 1 is a diagram illustrating an example of an information processing system 100 according to an embodiment. The information processing system 100 includes an information processing device 200, a display device 300, and a controller 400.

The display device 300 displays images output from the information processing device 200. The display device 300 can be implemented using, for example, a liquid crystal monitor, an organic EL (Electroluminescence) monitor, a PDP (Plasma Display Panel) monitor, or a CRT (Cathode Ray Tube) monitor. It should be noted that the display device 300 is connected, for example, via an HDMI (registered trademark) terminal (not shown) of the information processing device 200 as one of the peripheral equipment of the information processing device 200.

The information processing device 200 includes a main processor which will be described later and a storage device to execute a variety of applications software. Further, the information processing device 200 can be connected to a variety of peripheral equipment. For example, the information processing device 200 includes an optical disc drive 202 to read information stored on a CD (Compact Disc), DVD (Digital Versatile Disc), Blu-ray (registered trademark) disc, or other type of optical disc. Further, the information processing device 200 includes a USB (Universal Serial Bus) port 204 to connect to an unshown camera or keyboard via USB.

Still further, the information processing device 200 includes an unshown short-range wireless communication module based, for example, on Wi-Fi (registered trademark) or Bluetooth (registered trademark) to communicate with compatible peripheral equipment. In the example illustrated in FIG. 1, the controller 400 of the information processing device 200 wirelessly connects to the information processing device 200. It should be noted that the controller 400 may be able to connect to the information processing device 200 in a wired manner such as USB cable. In this case, the battery inside the controller 400 can be charged by power supplied in a wired manner.

In addition to the above, the information processing device 200 connects to the Internet in a wired manner via an unshown LAN (Local Area Network) port or wirelessly via the above wireless communication module for exchange of information. In addition to the above, the information processing device 200 may be able to connect to peripheral equipment via an IEEE1394 (Institute of Electrical and Electronic Engineers 1394) terminal, an MIDI (Musical Instrument Digital Interface) terminal, or other terminal.

Although FIG. 1 illustrates, as an example of the information processing device 200, a stationary game console, the information processing device 200 is not limited thereto, but may be a PC, a Blu-ray/DVD recorder, or other device. Further, the information processing device 200 is not limited to a stationary device, but may be a portable electronic equipment such as portable game console, smartphone, mobile phone, electronic book reader, or tablet PC. In this case, the display device 300 may be integral with the information processing device 200.

Figure 2:
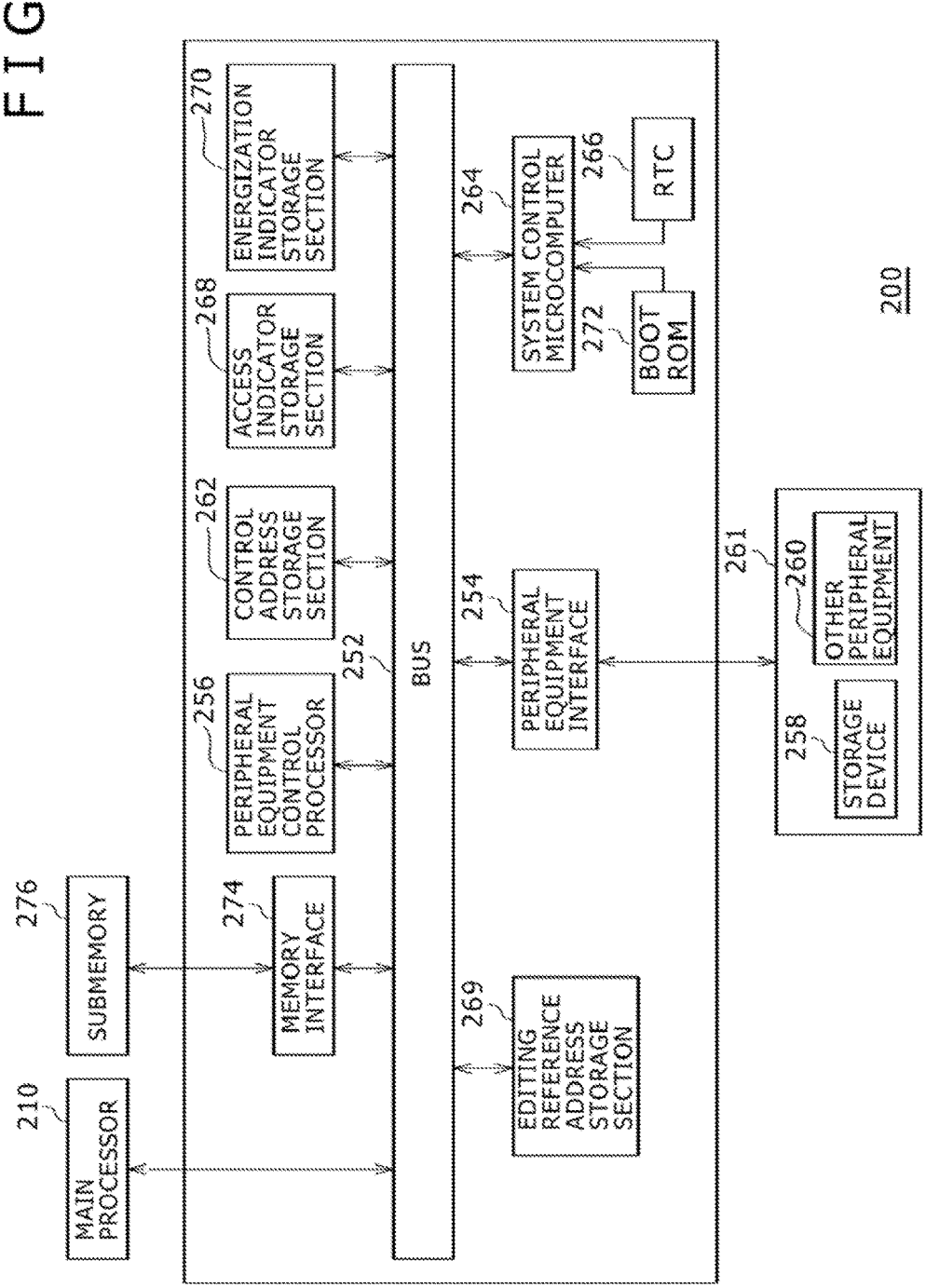
FIG. 2 is a diagram schematically illustrating the internal structure of an information processing device according to the embodiment.

FIG. 2 is a diagram schematically illustrating the internal structure of the information processing device 200 according to the embodiment. The information processing device 200 according to the embodiment includes, at least, a main processor 210 and a peripheral equipment control device 250. It should be noted that FIG. 2 illustrates the components implementing the information processing device 200 according to the embodiment, and that other components are not shown.

In the present specification, the term "peripheral equipment" refers, for example, to a piece of hardware different from the information processing device 200 and to a equipment used by being connected to the information processing device 200. Although various peripheral equipment of the information processing device 200 are available, not only the display device 300 and the controller 400 described above, a keyboard, an optical disc drive, and a camera but also a pointing device such as mouse, a networking equipment, a storage device, a memory card, a printer, a speaker, and so on can be cited as an example.

In FIG. 2, a storage device 258 is one of peripheral equipment and stores an operating system program, other applications programs, and data. The operating system program integrally controls the information processing device 200 including the peripheral equipment control device 250 and peripheral equipment. The storage device 258 is implemented by a known large capacity storage device such as HDD (Hard Disk Drive) or SSD (Solid State Drive). Further, in FIG. 2, peripheral equipment other than the storage device 258 are collectively referred to as other peripheral equipment 260. However, the other peripheral equipment 260 can include at least one of the above various peripheral equipment. In the present specification, the other peripheral equipment 260 will be hereinafter simply referred to as a peripheral equipment 261 unless no distinction is made between the storage device 258 and the other peripheral equipment 260.

The peripheral equipment control device 250 controls data flow between the peripheral equipment 261 and the main processor 210 and may be referred to as a southbridge. The main processor 210 is provided outside the peripheral equipment control device 250 to execute the operating system program or application program acquired via the peripheral equipment control device 250 or process data. For this reason, the main processor 210 can control the operation of the one or more peripheral equipment 261 via the peripheral equipment control device 250. DMA (Direct Memory Access) transfer of data from a memory card, one of the peripheral equipment 261, to a main memory 211 (illustrated in FIG. 9) is a specific example of control over the operation of the peripheral equipment 261 by the main processor 210.

The peripheral equipment control device 250 includes a bus 252 which connects the main processor 210 and the one or more peripheral equipment 261. The bus 252 is connected to a peripheral equipment interface 254 and connects to the one or more peripheral equipment 261 via the peripheral equipment interface 254. The peripheral equipment control device 250 also includes a peripheral equipment control processor 256 capable of controlling the operation of the one or more peripheral equipment 261. The peripheral equipment control processor 256 is connected to the bus 252. The peripheral equipment control processor 256 operates independently of the main processor 210, thus allowing the information processing device 200 to control the one or more peripheral equipment 261 by activating the peripheral equipment control processor 256 even if the main processor 210 is inactive.

Although not illustrated, the bus 252 includes a data bus, an address bus, a control bus, and so on. The data bus is used to transfer data between the peripheral equipment 261 and the main memory 211. The address bus transfers addresses that define data sources and destinations. The control bus is used to control the other peripheral equipment 261.

For example, if the main processor 210 or the peripheral equipment control device 250 transfers data from the storage device 258 to the main memory 211 by DMA, the main processor 210 or the peripheral equipment control device 250 identifies the storage device 258 using an address in the bus 252. This address is used to access the storage device 258. Further, the main processor 210 or the peripheral equipment control device 250 identifies the data destination using a memory address of the main memory 211 that indicates the data destination. These addresses are transferred via the address bus included in the bus 252. Actual data is transferred via the data bus included in the bus 252.

A control address storage section 262 stores addresses of the bus 252 referenced by the main processor 210 and the peripheral equipment control device 250 to access the one or more peripheral equipment 261. Although address referencing will be described later, the main processor 210 and the peripheral equipment control device 250 can control the peripheral equipment 261 by referencing the addresses stored in the control address storage section 262.

(Operation Mode of the Information Processing Device)

A description will be given first of the sharing of roles between the main processor 210 and the peripheral equipment control processor 256 for the information processing device 200 according to the embodiment to control the peripheral equipment 261. Then, a description will be given next of the operation modes of the information processing device 200.

The main processor 210 operates when the information processing device 200 is powered on and fully active. The main processor 210 offers higher processing capability than the peripheral equipment control processor 256, making the main processor 210 capable of executing heavy load software programs. On the other hand, the main processor 210 consumes more power and generates more heat than the peripheral equipment control processor 256 while active.

For example, the main processor 210 is overperforming processing whose software execution load is not high but which is time-consuming such as updating of the operating system program or firmware program of the information processing device 200 via a network. Activating the main processor 210 for such processing not only leads to high power consumption but also may result in shorter service life of a board including the main processor 210 due to heat generation.

For this reason, the information processing device 200 according to the present embodiment uses the peripheral equipment control device 250 to handle processing as described above. During a time period such as nighttime when the information processing device 200 is not used by the user, only the peripheral equipment control processor 256 is activated without energizing the main processor 210 to perform processing such as downloading of programs. This makes it possible to provide services independent of temperature cycle lifetime of the main processor 210, possibly reducing the power consumption necessary for the above processing to one several tenths. It should be noted that, in FIG. 2, a submemory 276 is used as a main storage of the peripheral equipment control processor 256 and is connected to the peripheral equipment control processor 256 via a memory interface 274 and the bus 252. The submemory 276 can be implemented by using a known technology such as SRAM (Static Random Access Memory) or DRAM (Dynamic Random Access Memory).

Thus, in the information processing device 200 according to the embodiment, the peripheral equipment control processor 256 controls the operation of the peripheral equipment 261 in place of the main processor 210 when the main processor 210 is inactive. When active, the main processor 210 has the control right over the peripheral equipment 261. Therefore, although energized, the peripheral equipment control processor 256 does not handle any specific processing.

Here, the peripheral equipment control device 250 includes a system control microcomputer 264. The system control microcomputer 264 supplies power to the main processor 210 or the peripheral equipment control processor 256 that is inactive, thus activating the processor. The system control microcomputer 264 controls the activation of the main processor 210 and the peripheral equipment control processor 256 by controlling the energization of the main processor 210 and the peripheral equipment control processor 256, i.e., controlling the supply of power to these processors. In this sense, the system control microcomputer 264 serves as a system control section of the information processing device 200. A description will be given below of operation modes of the information processing device 200 that are determined in accordance with the operation conditions of the main processor 210, the peripheral equipment control processor 256, and the system control microcomputer 264.

FIG. 3 is a diagram illustrating operation modes that can be assumed by the information processing device 200 according to the embodiment. As illustrated in FIG. 3, there are three operation modes that can be assumed by the information processing device 200 according to the embodiment.

A first operation mode is a mode in which the main processor 210 is energized and activated. In the first operation mode, the peripheral equipment control processor 256 is also energized. However, the peripheral equipment control processor 256 is on standby and does not perform any specific processing. Alternatively, in the first operation mode, the peripheral equipment control processor 256 may be reset and inactive with its clock disabled. In either case, the first operation mode is a bridge mode in which the peripheral equipment control device 250 operates as a so-called I/O (Input/Output) Bridge LSI (Large Scale Integration).

A second operation mode is a mode in which the main processor 210 is inactive without being energized and in which the peripheral equipment control processor 256 is active. The second operation mode is a subsystem mode in which the peripheral equipment control device 250 is active as a subsystem to substitute for the main processor 210. In the second operation mode, the peripheral equipment control processor 256 controls the operation of the peripheral equipment 261, and the main processor 210 does not consume any power.

A third operation mode is a mode in which neither the main processor 210 nor the peripheral equipment control processor 256 is energized and active, with the system control microcomputer 264 being active. The system control microcomputer 264 is even lower in processing capability than the peripheral equipment control processor 256, making it difficult for the system control microcomputer 264 to control the operation of the peripheral equipment 261. Therefore, the third operation mode is a standby mode activating the main processor 210 by using switching-on of an unshown power button by the user as a trigger. In the third operation mode, the system control microcomputer 264 may activate the peripheral equipment control processor 256 with a timer by referencing a real-time clock (RTC) 266 so that the peripheral equipment control processor 256 can perform a predetermined task (e.g., downloading of a software program via a network). It should be noted that the system control microcomputer 264 is constantly active to manage the power supply and temperature of the information processing device 200.

(Bus Protection)

As described above, the information processing device 200 according to the embodiment can control the peripheral equipment 261 by using the peripheral equipment control processor 256 rather than the main processor 210 that consumes more power, thus making it possible to provide services independent of temperature cycle lifetime of the main processor 210 and suppress consumption. However, the fact that the peripheral equipment control processor 256 can control the peripheral equipment 261 means that if a malicious third party acquires the control right over the peripheral equipment control processor 256 in some way, it is likely that the peripheral equipment 261 may also be controlled. As a result, it is difficult to deny that there is no risk of buffer overflow attack as the peripheral equipment control processor 256 rewrites the DMA settings, descriptors, and so on specified by the main processor 210, for example, during data transfer from the main processor 210 to the main memory 211 via the peripheral equipment 261 by DMA.

The information processing device 200 according to the embodiment has a bus protection function to prevent buffer overflow attack by a third party. The bus protection function prohibits access to the peripheral equipment 261 by the peripheral equipment control processor 256 and the system control microcomputer 264 via the bus 252. A description will be given below of the bus protection function of the information processing device 200 according to the embodiment.

In FIG. 2, while the main processor 210 is active, i.e., while the information processing device 200 is in the first operation mode, the bus 252 prohibits the peripheral equipment control processor 256 from accessing the addresses of the bus 252 used to access the peripheral equipment 261 (hereinafter referred to as "peripheral equipment addresses"). It should be noted that even while the information processing device 200 is in the first operation mode, the system control microcomputer 264 can access the peripheral equipment 261 that are used to manage the power supply and temperature of the information processing device 200. Further, while the main processor 210 is inactive, i.e., while the information processing device 200 is in the second operation mode, the bus 252 permits access to the peripheral equipment addresses by the peripheral equipment control processor 256 and the system control microcomputer 264.

Thus, the bus 252 controls whether or not the peripheral equipment control processor 256 can access the peripheral equipment addresses in accordance with the operation mode of the information processing device 200. As a result, even if a third party acquires the control right over the peripheral equipment control processor 256, it is possible to prevent buffer overflow attack by the third party via the peripheral equipment control processor 256 during DMA transfer from the main processor 210 to the peripheral equipment 261. It should be noted that the peripheral equipment 261 that are used to manage the power supply and temperature of the information processing device 200 has no DMA function. Therefore, it is difficult for the third party to attempt buffer overflow attack using the peripheral equipment 261.

The peripheral equipment addresses stored in the control address storage section 262 are addresses of the bus 252 that are associated, on a one-to-one basis, with the peripheral equipment 261 to uniquely identify the peripheral equipment 261 to be controlled. Therefore, there is a degree of freedom in how peripheral equipment addresses are assigned to the peripheral equipment 261, and the assignment of addresses can be changed. In the information processing device 200 according to the embodiment, the assignment of peripheral equipment addresses is implemented by using the TA (Translation Address) function of the peripheral equipment 261. We assume, for example, that when the main processor 210 or the peripheral equipment control processor 256 accesses a peripheral equipment X that is associated with address X in the peripheral equipment addresses, the address actually accessed by the processor is address A. We also assume that when the main processor 210 or the peripheral equipment control processor 256 accesses another peripheral equipment Y that is associated with address Y in the peripheral equipment addresses, the address actually accessed by the processor is address B. The TA function is a known technology designed to convert the address A to the address X and the address B to the address Y. Editing reference addresses stored in an editing reference address storage section 269 are addresses referenced to edit the association for address conversion handled by the TA function. The main processor 210 can edit the address conversion association via editing reference addresses.

The peripheral equipment control device 250 includes an access indicator storage section 268. The access indicator storage section 268 stores an access yes/no indicator that indicates whether or not the peripheral equipment control processor 256 and the system control microcomputer 264 can reference a second storage device reference address. We assume, for example, that the main processor 210 prohibits access to a specific peripheral equipment address by the peripheral equipment control processor 256 and the system control microcomputer 264 by accessing the access indicator storage section 268. We also assume that, at this time, access to the access indicator storage section 268 is changed to a completely different address space as a result of editing of the address conversion association of the TA function by the third party. For example, we assume that, in the above case, the address A is converted to the address Y, and that the address B is converted to the address X. In such a case, even if an attempt is made to prohibit access to the peripheral equipment X, but if the address conversion association is changed, access prohibition setting by the main processor 210 is not enabled. This may result in the peripheral equipment 261 being controlled by the peripheral equipment control processor 256.

For this reason, the bus 252 permits access to editing reference addresses by the main processor 210. On the other hand, the bus 252 prohibits access to editing reference addresses by the peripheral equipment control processor 256 and the system control microcomputer 264 irrespective of the operation mode of the information processing device 200. As a result, even if the control right over the peripheral equipment control processor 256 is acquired by a third party, the peripheral equipment control processor 256 does not change the address conversion association, thus preventing the peripheral equipment control processor 256 from controlling the peripheral equipment 261. In the present specification, we assume that the main processor 210, for example, accesses the peripheral equipment 261 through address conversion based on the TA function. The address referenced by each processor to access the specific peripheral equipment 261 is associated, on a one-to-one basis, with the peripheral equipment 261. Therefore, change to the address conversion association of the TA function will be simply written as "change to the association between a peripheral equipment address and a peripheral equipment."

It should be noted that controlling whether or not to permit referencing of an address of the bus 252 using the bus 252 and the control address storage section 262 can be implemented by using a known bus having the bus protection function. The information processing device 200 according to the embodiment implements the above control over access to peripheral equipment addresses in accordance with the operation mode for each processor using a known bus having the bus protection function.

(Preventing Rollback Attack of the Operating System Program)

A description has been given above of the bus protection function of the information processing device 200 according to the embodiment. At least part of the security of the information processing device 200 including the bus protection function can be implemented as the main processor 210 executes the operating system program stored in the storage device 258.

In general, the operating system program is often updated to add new functions and provide improved security. Therefore, the latest operating system program can implement the richest security functions. As a result, if so-called rollback attach, i.e., downgrading of the operating system program stored in the storage device 258 by a third party, is successful, the security functions of the information processing device 200 may degrade.

For this reason, the information processing device 200 according to the embodiment is equipped with a function to prevent rollback attack of the operating system program by using the bus protection function described above. A description will be given below of prevention against rollback attack of the operating system program.

Figure 4:
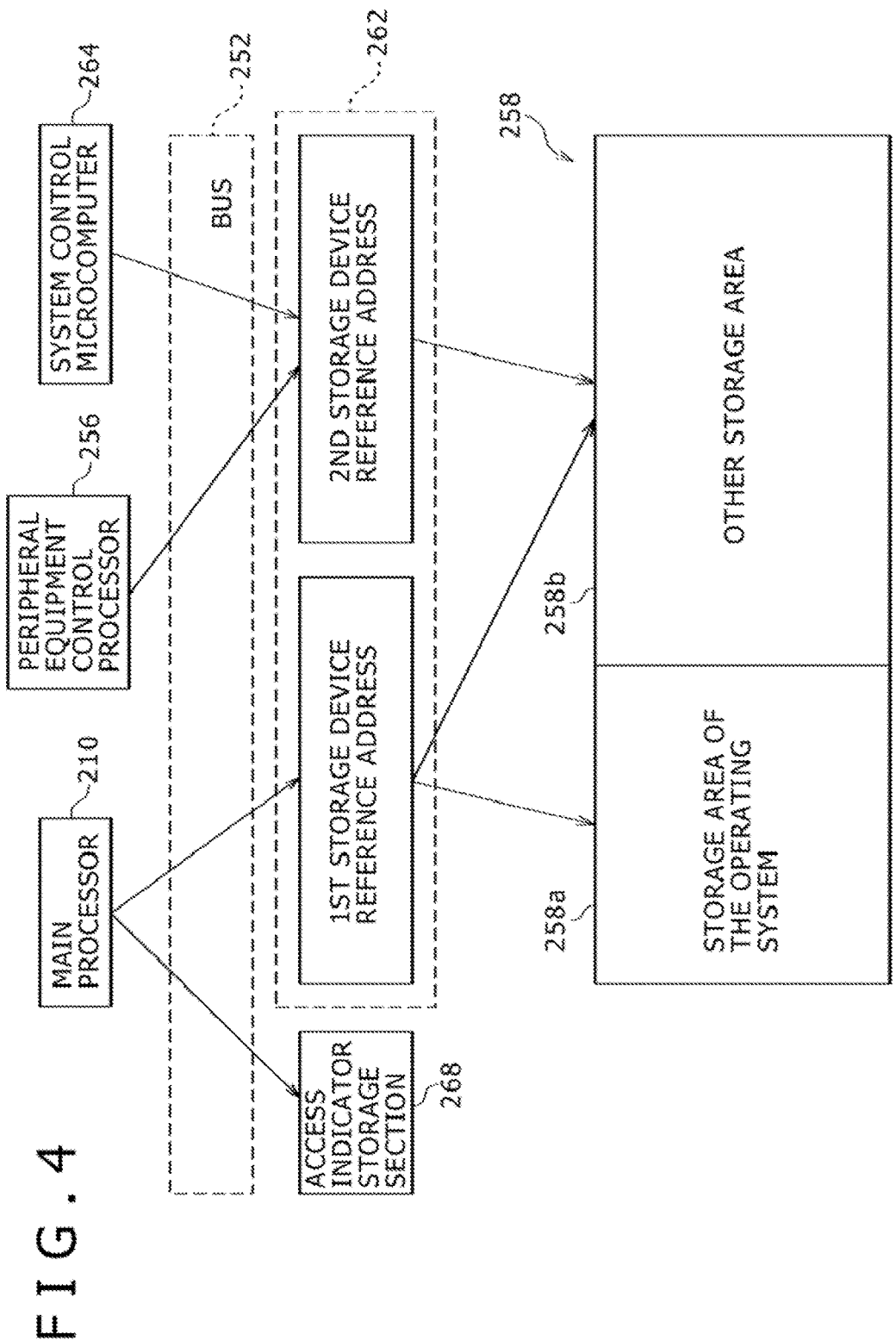
FIG. 4 is a diagram describing a function to prevent rollback attack according to the embodiment.

FIG. 4 is a diagram describing a function to prevent rollback attack according to the embodiment. As illustrated in FIG. 4, the storage device 258 includes two storage areas, an operating system storage area 258a adapted to store the operating system program and other storage area 258b adapted to store programs other than the operating system program and data. It should be noted that the operating system storage area 258a and the other storage area 258b are physically different areas in the storage device 258. These areas can be set only once on the peripheral equipment control device 250, for example, by the manufacturer of the information processing device 200 at the time of manufacture and will not be changed thereafter.

The storage device 258 is one of the peripheral equipment 261 and can be basically accessed by the main processor 210, the peripheral equipment control processor 256, and the system control microcomputer 264. When accessing the storage device 258, the main processor 210, the peripheral equipment control processor 256, or the system control microcomputer 264 references the address used to access the storage device 258 as when accessing the other peripheral equipment 261. This address is stored in the control address storage section 262.

Here, the control address storage section 262 stores first and second storage device reference addresses. The first storage device reference address is used to access the operating system storage area 258a adapted to store the operating system program of all the data stored in the storage device 258. The second storage device reference address is used to access the other storage area 258b other than the area adapted to store the operating system program. Here, the control address storage section 262 stores the first and second storage device reference addresses. The first storage device reference address permits access to arbitrary data stored in the storage device 258, i.e., the entire storage area of the storage device 258. The second storage device reference address permits access to only the other storage area 258b other than the area adapted to store the operating system program. The bus 252 prohibits the peripheral equipment control processor 256 and the system control microcomputer 264 from referencing the first storage device reference address irrespective of the operation mode of the information processing device 200.

The main processor 210 accesses the other storage area 258b by referencing the first storage device reference address. The peripheral equipment control processor 256 and the system control microcomputer 264 access the other storage area 258b by referencing the second storage device reference address. However, the bus 252 does not typically permit the peripheral equipment control processor 256 or the system control microcomputer 264 to reference the second storage device reference address.

More specifically, the peripheral equipment control device 250 includes the access indicator storage section 268 as described above. The access indicator storage section 268 stores the access yes/no indicator that indicates whether or not the peripheral equipment control processor 256 and the system control microcomputer 264 can reference the second storage device reference address. When the access yes/no indicator stored in the access indicator storage section 268 indicates that the second storage device reference address can be referenced by the peripheral equipment control processor 256, the bus 252 permits the peripheral equipment control processor 256 or the system control microcomputer 264 to reference the second storage device reference address.

On the other hand, when the access yes/no indicator indicates that the second storage device reference address is not referenced by the peripheral equipment control processor 256 and the system control microcomputer 264, the bus 252 prohibits the peripheral equipment control processor 256 or the system control microcomputer 264 from referencing the second storage device reference address. In this sense, the access yes/no indicator stored in the access indicator storage section 268 serves as an access blocker adapted to prohibit access to the storage device 258 by the peripheral equipment control processor 256 and the system control microcomputer 264.

The bus 252 prohibits the peripheral equipment control processor 256 and the system control microcomputer 264 from making a change to the access yes/no indicator. This can be implemented, for example, by using the bus protection function described above. That is, the control address storage section 262 includes an address referenced to access the access indicator storage section 268. The bus 252 permits only the main processor 210 to reference the address.

Before accessing the storage area 258a by referencing the first storage device reference address, the main processor 210 changes the access yes/no indicator stored in the access indicator storage section 268 so that referencing is prohibited. Further, after terminating its access to the storage area 258a, the main processor 210 changes the access yes/no indicator stored in the access indicator storage section 268 so that referencing is permitted. Therefore, when the main processor 210 accesses the storage area 258a, the peripheral equipment control processor 256 and the system control microcomputer 264 access neither the storage area 258a nor the storage area 258b.

Figure 5:
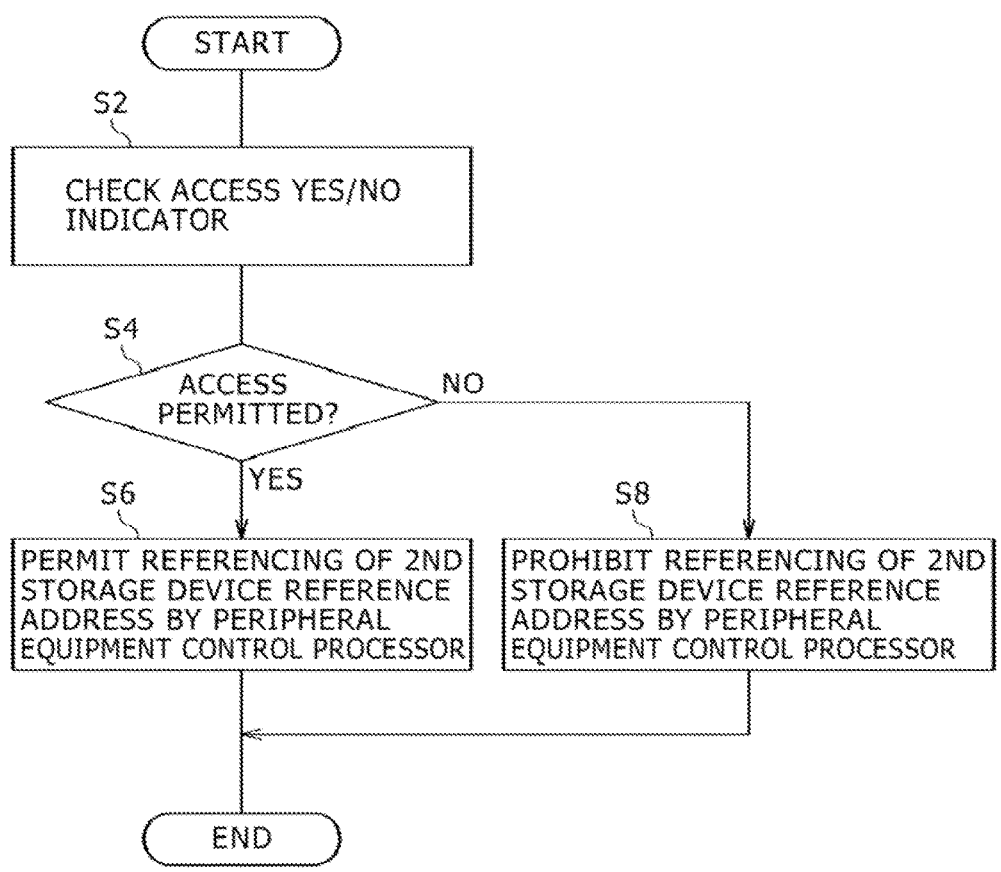
FIG. 5 is a flowchart describing a processing flow followed when a peripheral equipment control processor according to the embodiment references other storage area of a storage device.

FIG. 5 is a flowchart describing a processing flow followed when the peripheral equipment control processor 256 according to the embodiment references the other storage area 258b of the storage device 258. The processing in this flowchart begins when the peripheral equipment control processor 256 references the second storage device reference address.

When the peripheral equipment control processor 256 makes a request to reference the second storage device reference address, the bus 252 checks the access yes/no indicator stored in the access indicator storage section 268 (S2). If the access yes/no indicator indicates that the second storage device reference address can be referenced by the peripheral equipment control processor 256 (Y in S4), the bus 252 permits the peripheral equipment control processor 256 to reference the second storage device reference address (S6).

If the access yes/no indicator does not indicate that the second storage device reference address can be referenced by the peripheral equipment control processor 256 (N in S4), the bus 252 prohibits the peripheral equipment control processor 256 from referencing the second storage device reference address (S8).

This prevents rewriting of the storage area 258a by a third party in such a manner as to downgrade the operating system program by accessing the storage area 258a via the second storage device reference address during access of the main processor 210 to the storage area 258a even if the third party acquires the control right over the peripheral equipment control processor 256. Further, the peripheral equipment control processor 256 does not reference the first storage device reference address as described above. This makes it possible to prevent rollback of the operating system program by the peripheral equipment control processor 256 via the first storage device reference address.

It should be noted that a similar rollback protection function can be implemented by providing a new storage device separately from the storage device adapted to store the operating system program, storing programs other than the operating system program and data in the new storage, and using the bus protection function. That is, only the main processor 210 is permitted access to the storage device adapted to store the operating system program. The peripheral equipment control processor 256 and the system control microcomputer 264 are prohibited from access to this storage device. As compared to this approach, the information processing device 200 according to the embodiment can prevent rollback attack of the operating system program by using the storage device 258 alone. Further, a general-purpose device is enough for use as the storage device 258. This suppresses cost as compared to a case in which a plurality of storage devices are provided or a special storage device is made available, thus contributing to improved versatility.

(Data Structure of the Control Address Storage Section)

FIG. 6 is a diagram schematically illustrating the data structure of the control address storage section 262 according to the embodiment. FIG. 6 summarizes whether the referencing of the addresses by each processor is permitted or prohibited in different operation modes of the information processing device 200. FIG. 6 is a configuration diagram illustrating the permission or prohibition of address referencing to implement the bus protection function and prevention against rollback attack using the bus 252.

All features will not be described to avoid redundant description. However, FIG. 6 illustrates that although the main processor 210 is permitted to reference the editing reference addresses, the peripheral equipment control processor 256 and the system control microcomputer 264 are prohibited from referencing the editing reference addresses irrespective of the operation mode of the information processing device 200. Further, "Permitted on condition" in FIG. 6 indicates that the peripheral equipment control processor 256 or the system control microcomputer 264 is permitted to reference the second storage device reference address only when it is indicated that the peripheral equipment control processor 256 is permitted to reference the second storage device reference address.

(Transition from One Operation Mode to Another)

The bus protection function and prevention against rollback attack of the information processing device 200 according to the embodiment have been described above. A description will be given next of the transition of the information processing device 200 according to the embodiment from one operation mode to another.

If the information processing device 200 is a stationary game console, the information processing device 200 has an attachment plug (not shown). When the attachment plug is inserted into an electrical outlet, the information processing device 200 can assume any one of the first to third operation modes described above.

When the user of the information processing device 200 inserts the unplugged attachment plug into the electrical outlet and before he or she presses the power button of the information processing device 200, the information processing device 200 assumes the second or third operation mode described above. More specifically, the peripheral equipment control device 250 of the information processing device 200 includes an energization indicator storage section 270 as illustrated in FIG. 2. The energization indicator storage section 270 stores an energization yes/no indicator adapted to indicate whether or not the peripheral equipment control processor 256 can be energized when the main processor 210 is inactive. The information processing device 200 assumes the second or third operation mode in response to the energization yes/no indicator.

When the attachment plug is inserted into the electrical outlet, power is supplied to the system control microcomputer 264, making the system control microcomputer 264 active and putting the information processing device 200 in the third operation mode. At this time, if the energization yes/no indicator stored in the energization indicator storage section 270 indicates that the energization of the peripheral equipment control processor 256 is permitted, the system control microcomputer 264 supplies power to the peripheral equipment control processor 256. This activates the peripheral equipment control processor 256, causing the information processing device 200 to make a transition from the third operation mode to the second operation mode.

As described above, when the information processing device 200 is in the second operation mode, the peripheral equipment control processor 256 can control the peripheral equipment. This makes it possible to perform processing such as downloading of programs without activating the main processor 210. Further, a camera, for example, can be activated as a peripheral equipment, thus allowing to capture the user's face or gesture. As a result, the peripheral equipment control processor 256 can handle user authentication, activation of the main processor 210, or other task by analyzing the captured user's face or gesture, thus contributing to improved usability. This can be implemented by using known authentication and gesture recognition technologies.

In contrast, if the energization yes/no indicator stored in the energization indicator storage section 270 does not indicate that the energization of the peripheral equipment control processor 256 is permitted, the system control microcomputer 264 does not supply power to the peripheral equipment control processor 256 even when the attachment plug is inserted into the electrical outlet. Therefore, the information processing device 200 remains in the third operation mode. The peripheral equipment control processor 256 consumes less power than the main processor 210. However, the peripheral equipment control processor 256 needs more power than the system control microcomputer 264 for operation. Therefore, if the user wishes to suppress standby power of the information processing device 200, it is possible to further suppress power consumption by prohibiting the information processing device 200 from assuming the second operation mode. This is also effective in reducing power consumption and keeping the battery last longer, for example, when the information processing device 200 is a battery-driven portable terminal.

When the information processing device 200 is in the second or third operation mode, pressing of the power button of the information processing device 200 by the user serves as a trigger, and the system control microcomputer 264 supplies power to the main processor 210, reads a program code from a boot ROM (Read Only Memory) 272, and supplies the code to the main processor 210. The program code is used to read the operating system program from the boot ROM 272 and activate the program.

When supplied with power and activated, the main processor 210 executes the program code stored in the boot ROM 272, thus reading the operating system program from the storage area 258a of the storage device 258. If the power button is pressed when the information processing device 200 is in the second operation mode, both the main processor 210 and the peripheral equipment control processor 256 are temporarily active until the operating system activates. The above technology for prevention against rollback attack of the operating system program is particularly effective during a period of time in which the main processor 210 and the peripheral equipment control processor 256 are temporarily both active at the time of startup of the operating system.

When the main processor acquires the control right over the peripheral equipment 261 after the operating system has activated, the peripheral equipment control processor 256 is on standby although energized, causing the information processing device 200 to make a transition to the first operation mode.

The energization yes/no indicator stored in the energization indicator storage section 270 can be referenced by the system control microcomputer 264. However, only the main processor 210 is permitted to make a change to this indicator. This can be implemented by using the above bus protection function. When the information processing device 200 is in the first operation mode, the user can make a change to the energization yes/no indicator, for example, via an unshown system menu created with a GUI (Graphical User Interface).

FIG. 7 is a flowchart describing a processing flow followed when the information processing device 200 according to the embodiment makes a transition from the first operation mode to other operation mode.

If the user explicitly issues an instruction to terminate the system or if a predetermined end time is reached when the information processing device 200 is in the first operation mode, the main processor 210 acquires the instruction to terminate the system (S10). The system control microcomputer 264 checks the energization yes/no indicator stored in the energization indicator storage section 270 in response to an instruction from the main processor 210 (S12).

If the energization yes/no indicator permits the energization of the peripheral equipment control processor 256 (Y in S14), the system control microcomputer 264 maintains the peripheral equipment control processor 256 energized (S16). As a result, the information processing device 200 makes a transition to the second operation mode (S18). If the energization yes/no indicator does not permit the energization of the peripheral equipment control processor 256 (Y in S14), the system control microcomputer 264 stops energizing the peripheral equipment control processor 256 (S20). As a result, the information processing device 200 makes a transition to the third operation mode (S22). When the information processing device 200 makes a transition from the first operation mode to the second or third operation mode, the processing illustrated in this flowchart ends.

Figure 8:
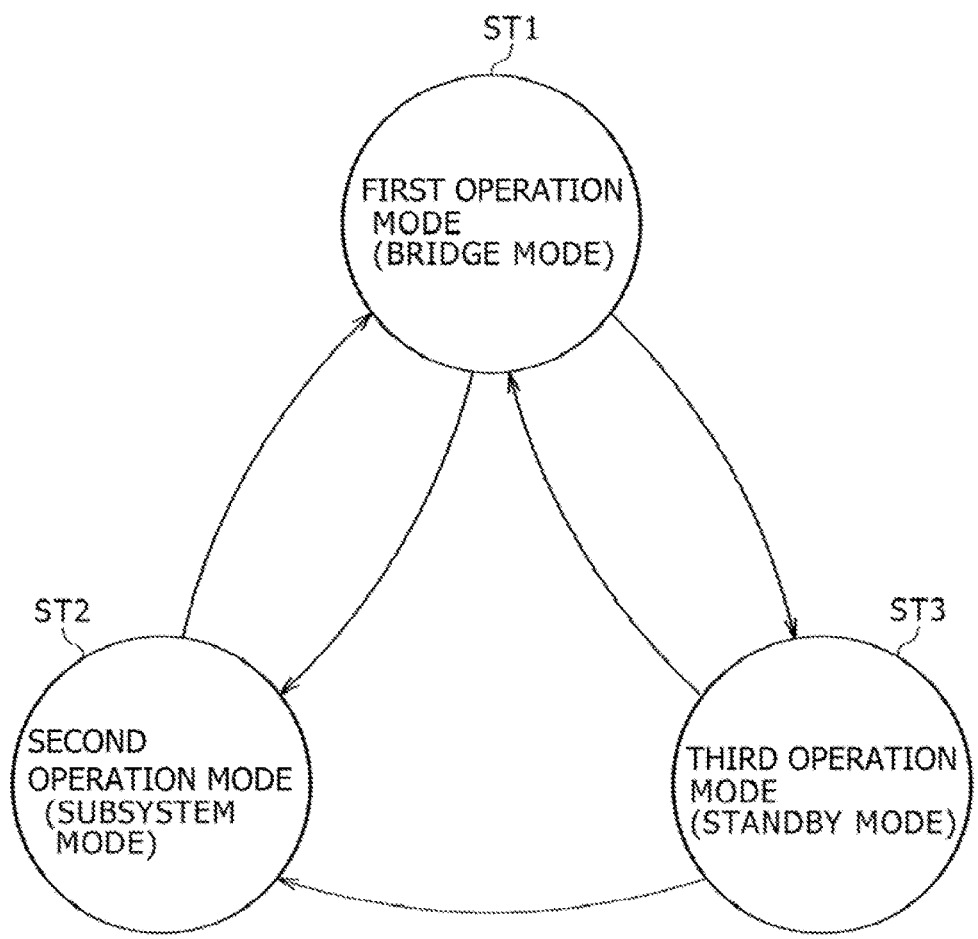
FIG. 8 is a transition diagram of operation modes that can be assumed by the information processing device according to the embodiment.

FIG. 8 is a transition diagram of the operation modes that can be assumed by the information processing device 200 according to the embodiment. As described earlier, a transition can be made to the first operation mode ST1 from the second operation mode ST2 and the third operation mode ST3. On the other hand, a transition can be made from the first operation mode ST1 to the second operation mode ST2 and the third operation mode ST3.

A transition can be made from the third operation mode ST3 to the second operation mode ST2. However, no transition is made from the second operation mode ST2 to the third operation mode ST3. This is consistent with the fact that only the main processor 210 is permitted to make a change to the energization yes/no indicator stored in the energization indicator storage section 270. That is, this means that when the information processing device 200 is in the second or third operation mode, the energization of the peripheral equipment control processor 256 is not started or stopped by an instruction of the user.

The peripheral equipment control processor 256 plays a so-called backstage role by handling processing such as downloading of programs in place of the main processor 210 during a time period such as nighttime when the information processing device 200 is not used by the user. Therefore, making the existence of the peripheral equipment control processor 256 known to the user may confuse the user. As a result, hiding the peripheral equipment control processor 256 from the user is more effective in providing improved usability and more desirable from the viewpoint of security.

(Power Groups)

A description has been given of the transition of the information processing device 200 according to the embodiment from one operation mode to another with reference to FIG. 8. A description will be given next of the operation modes of the information processing device 200 from the viewpoint of power management of the information processing device 200.

Figure 9:
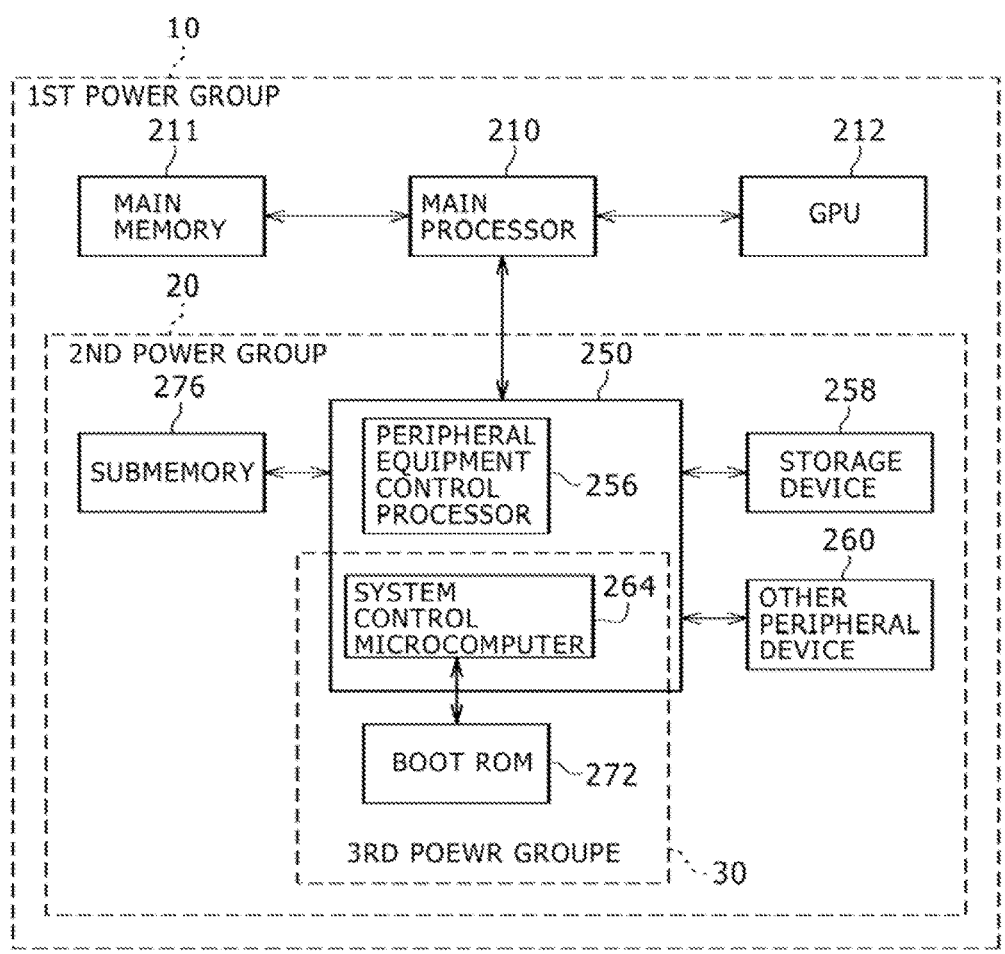
FIG. 9 is a diagram illustrating power groups of the information processing device according to the embodiment.

FIG. 9 is a diagram illustrating power groups of the information processing device 200 according to the embodiment. FIG. 9 schematically illustrates the classification of the information processing device 200 illustrated in FIG. 2 into a plurality of groups from the viewpoint of power management of the internal structure thereof. As illustrated in FIG. 9, the information processing device 200 according to the embodiment as a whole is classified into first, second, and third power groups 10, 20, and 30. Here, the term "power group" refers, for example, to a unit of power management of the information processing device 200, i.e., a unit of power supply.

The first power group 10 is a group that includes the whole of the information processing device 200 that includes the main processor 210, the main memory 211, and a GPU (Graphics Processing Unit) 212. In the first operation mode, power is supplied to all the components of the first power group. It should be noted that although also energized in the first operation mode as described above, the peripheral equipment control processor 256 is on standby and does not perform any specific processing or is reset and inactive with its clock disabled. In the first group, therefore, only the main processor 210 substantially consumes drive power.

The second power group 20 is a group that excludes the main memory 211, the main processor 210, and the GPU 212 from the components of the first power group. In the second operation mode, power is supplied to the components of the second power group. However, power is not supplied to the main processor 210 whose drive voltage is high. Therefore, the drive power of the second power group is smaller than that of the first power group.

The third power group 30 is a group that includes the system control microcomputer 264 and the boot ROM 272 as its components. In the third operation mode, power is supplied to the components of the third power group 30, but not to other components. The drive power of the system control microcomputer 264 is even smaller than that of the peripheral equipment control processor 256. As a result, the drive power of the third power group 30 is the smallest of all the three power groups.

Thus, the information processing device 200 according to the embodiment selects a different power group and supplies power to the selected power group in accordance with the purpose of operation of the information processing device 200, i.e., the operation mode. This makes it possible to change the drive power of the information processing device 200 properly as a system as a whole in accordance with the operation mode, thus contributing to reduced power consumption.

As described above, the information processing device 200 according to the embodiment provides a technology suppressing power consumption necessary to control the peripheral equipment 261.

In particular, it is possible to provide services independent of temperature cycle lifetime of the main processor 210, possibly reducing the power consumption necessary for the above processing to one several tenths. Further, even if a third party acquires the control right over the peripheral equipment control processor 256, it is possible to prevent buffer overflow attack by the third party via the peripheral equipment control processor 256 during DMA transfer from the main processor 210 to the peripheral equipment 261. Further, even if the third party acquires the control right over the peripheral equipment control processor 256, it is possible to prevent rollback of the operating system program by the peripheral equipment control processor 256. In addition, the function to prevent rollback is enabled when the operating system program and other data are stored in the same storage device 258. This provides reduced cost as compared to a case in which a plurality of storage devices are provided or a special storage device is made available, thus contributing to improved versatility.

Modification Example

Thus, the present disclosure has been described based on the embodiment. It is to be understood by those skilled in the art that the embodiment is illustrative, that various modifications can be made to the combination of the components and the processes thereof, and that such modifications also fall within the scope of the present disclosure.

A description has been given above of the technology preventing the acquisition of the control right over the main processor 210 by a third party even if the third party acquires the control right over the peripheral equipment control processor 256. In addition, the information processing device 200 may be configured to minimize possible acquisition of the control right over the peripheral equipment control processor 256 by a third party.

More specifically, a program code to be executed by the peripheral equipment control processor 256 may be signed so that, before the execution of the program code, the integrity is verified. It is possible to suppress a third party from causing the peripheral equipment control processor 256 to execute an arbitrary program code by prohibiting the execution of a program code whose integrity is degraded.

The present disclosure contains subject matter related to that disclosed in Japanese Priority Patent Application JP 2013-180543 filed in the Japan Patent Office on Aug. 30, 2013, the entire contents of which are hereby incorporated by reference.

What is claimed is:

1. A peripheral equipment control device controlling data flow via a peripheral equipment, the peripheral equipment control device comprising:
a peripheral equipment control processor that controls an operation of at least one peripheral equipment; and
a bus adapted to connect the peripheral equipment control processor, a main processor, and the peripheral equipment, the main processor being provided outside the peripheral equipment control device to control the operation of the peripheral equipment,
wherein the bus stores addresses that are referenced by the main processor and the peripheral equipment control processor to access the peripheral equipment, and the bus prohibits access to the peripheral equipment by the peripheral equipment control processor while the main processor is active,
wherein each of the peripheral equipment includes a storage device adapted to store data accessible by the main processor and the peripheral equipment control processor,
wherein data stored in the storage device includes an operating system program executed by the main processor to control the operation of the peripheral equipment control device and the peripheral equipment,
wherein the bus stores a first storage device reference address used to access arbitrary data stored in the storage device and a second storage device reference address used to access the area of the storage device other than that which stores the operating system program of all the data stored in the storage device, and the bus prohibits the peripheral equipment control processor from referencing the first storage device reference address,
wherein the peripheral equipment control device further comprises an access indicator storage section adapted to store an access yes/no indicator that indicates whether or not the peripheral equipment control processor can reference the second storage device reference address,
wherein the bus permits the peripheral equipment control processor to reference the second storage device reference address when the access yes/no indicator stored in the access indicator storage section indicates that the second storage device reference address can be referenced by the peripheral equipment control processor,
wherein the bus prohibits the peripheral equipment control processor from referencing the second storage device reference address when the access yes/no indicator stored in the access indicator storage section indicates that the second storage device reference address is not referenced by the peripheral equipment control processor, and
wherein the access indicator storage section prohibits the peripheral equipment control processor from making a change to the access yes/no indicator.

2. The peripheral equipment control device of claim 1, wherein the bus permits access to the peripheral equipment by the peripheral equipment control processor while the main processor is inactive.

3. The peripheral equipment control device of claim 1, wherein the bus stores editing reference addresses that are referenced to change the association between addresses stored in a control address storage section and the peripheral equipment, permits the main processor to reference the editing reference addresses, and prohibits the peripheral equipment control processor from referencing the editing reference addresses.

4. The peripheral equipment control device of claim 1, further comprising:
a system control section adapted to control the activation of the main processor and the peripheral equipment control processor by controlling the energization of the main processor and the peripheral equipment control processor; and
an energization indicator storage section adapted to store an energization yes/no indicator adapted to indicate whether or not the peripheral equipment control processor can be energized when the main processor is inactive, wherein
the system control section references the energization yes/no indicator stored in the energization indicator storage section if the main processor is inactive and maintains the peripheral equipment control processor energized if the energization yes/no indicator permits the energization of the peripheral equipment control processor.

5. An information processing device comprising:
a peripheral equipment control device adapted to control data flow via a peripheral equipment; and
a main processor provided outside the peripheral equipment control device to control the operation of at least one peripheral equipment, wherein
the peripheral equipment control device includes
a peripheral equipment control processor that controls the operation of the at least one peripheral equipment; and
a bus adapted to connect the peripheral equipment control processor, the main processor, and the peripheral equipment, the bus also adapted to store addresses that are referenced by the main processor and the peripheral equipment control processor to access the at least one peripheral equipment, and
the bus prohibits access to the peripheral equipment by the peripheral equipment control processor while the main processor is energized and active,
wherein the peripheral equipment includes a storage device adapted to store data accessible by the main processor and the peripheral equipment control processor,
wherein data stored in the storage device includes an operating system program executed by the main processor to control the operation of the peripheral equipment control device and the peripheral equipment,
wherein the bus stores a first storage device reference address used to access arbitrary data stored in the storage device and a second storage device reference address used to access the area of the storage device other than that which stores the operating system program of all the data stored in the storage device, and the bus prohibits the peripheral equipment control processor from referencing the first storage device reference address,
wherein the peripheral equipment control device further comprises an access indicator storage section adapted to store an access yes/no indicator that indicates whether or not the peripheral equipment control processor can reference the second storage device reference address,
wherein the bus permits the peripheral equipment control processor to reference the second storage device reference address when the access yes/no indicator stored in the access indicator storage section indicates that the second storage device reference address can be referenced by the peripheral equipment control processor,
wherein the bus prohibits the peripheral equipment control processor from referencing the second storage device reference address when the access yes/no indicator stored in the access indicator storage section indicates that the second storage device reference address is not referenced by the peripheral equipment control processor, and
wherein the access indicator storage section prohibits the peripheral equipment control processor from making a change to the access yes/no indicator.

6. A peripheral equipment control device controlling data flow via a peripheral equipment, the peripheral equipment control device comprising:
a peripheral equipment control processor that can control an operation of at least one peripheral equipment; and
a bus adapted to connect the peripheral equipment control processor, a main processor, and the peripheral equipment, the main processor being provided outside the peripheral equipment control device to control the operation of the peripheral equipment,
wherein the bus stores addresses that are referenced by the main processor and the peripheral equipment control processor to access the peripheral equipment, and the bus prohibits access to the peripheral equipment by the peripheral equipment control processor while the main processor is active,
wherein each of the peripheral equipment includes a storage device adapted to store data accessible by the main processor and the peripheral equipment control processor,
wherein data stored in the storage device includes an operating system program executed by the main processor to control the operation of the peripheral equipment control device and the peripheral equipment, and
wherein the bus stores a first storage device reference address used to access arbitrary data stored in the storage device and a second storage device reference address used to access the area of the storage device other than that which stores the operating system program of all the data stored in the storage device, and the bus prohibits the peripheral equipment control processor from referencing the first storage device reference address
the peripheral equipment control device further comprising:
an access indicator storage section adapted to store an access yes/no indicator that indicates whether or not the peripheral equipment control processor can reference the second storage device reference address, wherein
the bus permits the peripheral equipment control processor to reference the second storage device reference address when the access yes/no indicator stored in the access indicator storage section indicates that the second storage device reference address can be referenced by the peripheral equipment control processor, and
the bus prohibits the peripheral equipment control processor from referencing the second storage device reference address when the access yes/no indicator stored in the access indicator storage section indicates that the second storage device reference address is not referenced by the peripheral equipment control processor.

* * * * *